United States Patent
Ehrler et al.

(10) Patent No.: US 8,459,919 B2
(45) Date of Patent: Jun. 11, 2013

(54) FASTENING DEVICE

(75) Inventors: Klaus Ehrler, Niederstetten (DE); Mauro Moraes De Souza, Jundiai (BR); Juliano Savoy, Jundiai (BR); Paulo Cesar Sigoli, Jundiai (BR)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/309,375

(22) Filed: Dec. 1, 2011

(65) Prior Publication Data

US 2012/0107069 A1    May 3, 2012

Related U.S. Application Data

(63) Continuation of application No. PCT/DE2010/000598, filed on May 28, 2010.

(30) Foreign Application Priority Data

Jun. 3, 2009 (DE) .......................... 10 2009 023 721

(51) Int. Cl.
F16B 39/26 (2006.01)
(52) U.S. Cl.
USPC .......................... 411/149; 411/544; 411/533
(58) Field of Classification Search
USPC .......................... 411/533, 544, 147, 149, 150
See application file for complete search history.

(56) References Cited

U.S. PATENT DOCUMENTS

| | | | | |
|---|---|---|---|---|
| 99,473 A * | 2/1870 | Pratt | | 411/135 |
| 1,635,313 A * | 7/1927 | Dieterich | | 411/135 |
| 2,430,884 A * | 11/1947 | Noyes | | 411/197 |
| 4,969,788 A * | 11/1990 | Goiny | | 411/428 |
| 5,618,145 A * | 4/1997 | Kuo | | 411/432 |
| 5,653,481 A * | 8/1997 | Alderman | | 285/363 |

* cited by examiner

*Primary Examiner* — Flemming Saether
(74) *Attorney, Agent, or Firm* — Crowell & Moring LLP

(57) ABSTRACT

A fastening device comprising at least one nut, at least one support unit, and at least one spring element, with the nut, the support unit, and the spring element being constructed and matched to each other in such a way that the spring element exerts a force between the nut and the support unit.

2 Claims, 1 Drawing Sheet

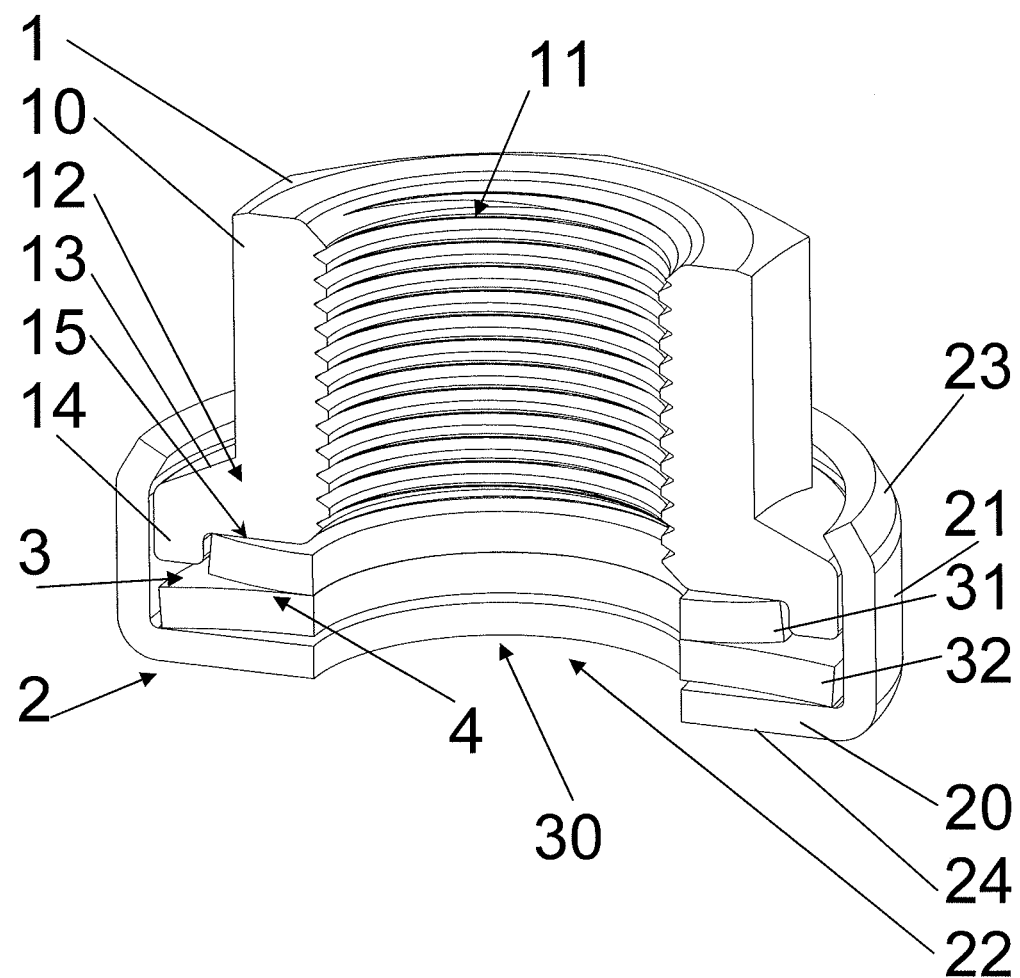

FASTENING DEVICE

CROSS REFERENCE TO RELATED APPLICATIONS

This application is a continuation of international patent application no PCT/DE2010/000598, filed May 28, 2010, designating the United States of America and published in German on Dec. 9, 2010 as WO 2010/139299, the entire disclosure of which is incorporated herein by reference. Priority is claimed based on Federal Republic of Germany patent application no. DE 10 2009 023 721.6, filed Jun. 3, 2009, the entire disclosure of which is likewise incorporated herein by reference.

BACKGROUND OF THE INVENTION

The present invention relates to a fastening device comprising at least one nut and at least one support unit.

For joining components to each other, it is disclosed, for example, in the prior art to use screws or nuts that are preloaded by springs (e.g. WO 00/63567, DE 25 41 826). The process of preloading the screws or nuts secures same. It is also known in the prior art to equip nuts with suitably designed washers (DE 26 01 731). The disadvantage in each of the prior-art methods is that the fastening device is made of a plurality of single components or it necessitates expensive production.

SUMMARY OF THE INVENTION

It is the object of the present invention to provide a fastening device that allows components to be fixed to each other under preload and that is preferably characterized by a compact design.

According to the invention, this object is achieved in that at least one spring element is provided, and the nut, the support unit, and the spring element are constructed and matched to each other in such a way that the spring element exerts a force between the nut and the support unit. Another name for a generic device of this type is a lock nut. In the prior art, the support unit is in the form of a washer.

Thus the spring element applies retention forces that secure the nut relative to the bolt or the screw, i.e. in general, relative to its counter component on which the nut is mounted.

In one advantageous embodiment, the nut comprises a base body, and at least one aperture is provided in the base body. The bore of the nut is dimensioned so as to match the screw or the bolt and it has a suitable internal thread.

In another advantageous embodiment, the bore is continuous or it is a blind bore. If the bore is a blind bore, it is a so-called cap nut, for example. In an embodiment, the base body is substantially cylindrical. In a further embodiment, the aperture extends substantially in the direction of the longitudinal axis of the base body. In an embodiment, the base body has on its surface force application points, by means of which the nut can be rotated as a whole around a bolt or a screw, in particular. In an embodiment, the base body is shaped like a prism, and in another embodiment like a circular cylinder. The external surface of the nut can be of any desired shape.

Provision is made in one embodiment for the base body to comprise a shoulder on at least one end region.

In another embodiment of the invention, the shoulder protrudes outwardly from the aperture. In this case, the external contour of the nut thus protrudes outwardly at one end region.

In yet another an embodiment of the invention, the shoulder is formed such that it extends substantially completely around the circumference of the base body. Alternatively, the shoulder may extend only partially around the circumference of the base body. In the first of these embodiments, the shoulder is thus made of a circumferential step, and in the alternate embodiment it is made only of segmental steps or projections, the dimensions and number of which can be specified according forces acting on the device.

In one preferred embodiment of the invention, the shoulder and the base body are a one-piece component. Alternatively, the shoulder and the base body may be a multi-part component. Thus in the first of these embodiments, the base body and the shoulder are formed integrally, and in the alternative embodiment, the shoulder may be a separate component that is, for example, welded, soldered or pressed onto the base body.

In another advantageous embodiment, the shoulder comprises a marginal lip or flange, at least in part. In this embodiment, the shoulder thus does not end as a flat surface, but it is instead delimited by a lip, the height of which can be specified as needed.

In still another embodiment, the lip is formed such that it extends substantially completely around the circumference of the shoulder. Alternatively, the lip may extend substantially, only in part, around the circumference of the shoulder.

In one advantageous embodiment, the shoulder and the lip are constructed and matched to each other in such a way that the shoulder and the lip form at least one supporting surface.

In another advantageous embodiment of the invention, the support unit is formed substantially like a sleeve. In contrast with the prior art, in this embodiment the support unit is not a washer, but instead it is sleeve-like so that, for example, the nut is partially encompassed. Thus this embodiment enables a compact and closed construction of the fastening device, for example. Advantageously, the nut and the support unit are also constructed and matched to each other in such a way that there are hardly any openings on the fastening device. In one embodiment, this applies particularly to the unmounted state of the fastening device on a bolt or a screw. The support unit is the component of the fastening device that comes into contact with a component that is to be secured by the fastening device.

In one embodiment, the support unit comprises at least one bottom portion and a side portion, and the bottom portion comprises at least one aperture. In another embodiment, the bottom portion is disk-shaped. In a further embodiment, the side portion abuts the edge of the bottom portion in the form of a circumferential surface. In an embodiment, the bore is, in particular, a through bore.

In another embodiment of the invention, the diameter of the aperture of the bottom portion of the support unit may be substantially equal to the inside diameter of the bore of the nut, or the diameter of the aperture of the bottom portion of the support unit may be smaller than an inside diameter of the bore of the nut, or the diameter of the aperture of the bottom portion of the support unit may be larger than the inside diameter of the bore of the nut.

In an embodiment, the support unit and the nut are constructed and arranged relative to each other in such a way that the aperture of the bottom portion of the support unit and the bore of the nut are disposed substantially one behind the other so as to be aligned with each other.

In one embodiment of the invention, the support unit and the nut are constructed and arranged relative to each other in such a way that at least one hollow space is located between the support unit and the nut.

In one embodiment of the invention, the support unit and the nut are constructed and arranged relative to each other in such a way that the hollow space is located substantially between the support unit and the shoulder of the nut. In this embodiment, the hollow space of the fastening device is thus located particularly between the end region of the nut, on which the shoulder is formed, and the support unit.

In another embodiment of the invention, the hollow space accommodates the spring element, at least in part. In this embodiment, the spring element is thus encompassed by the nut and the support unit. This results in an enclosed overall design that protects the spring element, for example, from contaminants and the like, which also enables simpler and safer storage and application of the fastening device.

In still another embodiment, the support unit and the nut are constructed and arranged relative to each other in such a way that the support unit is connected to the nut so as to be secured against loss. This feature also contributes to the compactness of the fastening device.

In a further embodiment of the invention, the side portion of the support unit comprises a beveled region on the side facing away from the bottom portion of the support unit.

In yet another embodiment of the invention, the support unit and the nut are constructed and arranged relative to each other in such a way that the beveled region of the side portion of the support unit has, at least in part, at least an inside diameter that is smaller than an outside diameter of the shoulder of the nut. Thus the support unit is located substantially in front of the shoulder and it also surrounds the rear side thereof so that the support unit virtually encompasses the shoulder at its margin.

In an embodiment of the invention, the beveled region has a substantially conically tapering inside diameter.

In an advantageous embodiment of the invention, the side portion of the support unit is beaded, at least in part, in the beveled region. Thus the support unit is beaded or crimped at least in one portion thereof.

In another embodiment of the invention, the support unit is provided with at least one external region which is constructed such that it exhibits substantially anti-slip properties. Thus the support unit is prevented from moving relative to the surface on which the fastening device is screwed, and damage is prevented from occurring.

In a further embodiment, the support unit and the nut are constructed and arranged relative to each other in such a way that the nut is capable of rotating relative to the support unit such that it does not transfer any substantial torque to the support unit. Thus the nut rotates substantially freely relative to the support unit.

In yet another embodiment, the spring element is constructed and disposed between the nut and the support unit in such a way that the force of the spring element acts substantially in the direction of the longitudinal axis of the nut. In this embodiment, the spring element thus applies a force in the direction in which the nut is mounted on a bolt or a screw.

In a still further embodiment, the spring element comprises at least one through opening.

In another embodiment of the invention, the spring element and the support unit are constructed and arranged relative to each other in such a way that the opening of the spring element and the aperture of the bottom portion of the support unit are disposed substantially one behind the other so as to be aligned with each other, and/or the spring element and the nut are constructed and arranged relative to each other in such a way that the opening of the spring element and the bore of the nut are disposed substantially one behind the other so as to be aligned with each other.

In still another embodiment of the invention, the spring element is constructed and arranged between the nut and the support unit in such a way that the spring element is substantially prevented from moving in the radial direction. When the spring element is substantially incapable of moving in the radial direction, then it is also unlikely for the spring element or a portion thereof to slip in front of any of the bores or openings of the fastening device and thus hinder the application of the same. That is, this embodiment substantially serves for simplifying the process of mounting the fastening device on the counter component—for example, a screw or a bolt. In a further embodiment, provision is made for locking the spring element, in particular.

In a preferred embodiment of the invention, the spring element has an outside diameter that is at least substantially equal to an inside diameter of the lip of the shoulder of the nut, and/or the spring element has an outside diameter that is at least substantially equal to an inside diameter of the side portion of the support unit.

In another preferred embodiment, the spring element comprises at least one first spring and a second spring.

In yet another preferred embodiment of the invention, the first spring and the second spring are arranged in series. Alternatively, the first spring and the second spring may be arranged parallel to each other.

In still another embodiment, at least the first spring or the second spring is a disk spring, and/or at least the first spring or the second spring is a coil spring.

In an additional embodiment of the invention, the first spring and/or the second spring has an outside diameter that is substantially equal to an inside diameter of the lip of the shoulder of the nut, and/or the first spring and/or the second spring has an outside diameter that is substantially equal to an inside diameter of the side portion of the support unit.

BRIEF DESCRIPTION OF THE DRAWINGS

The invention will be explained in further detail hereinafter with reference to an illustrative preferred embodiment shown in the accompanying drawing FIGURE which is a a cross-section of a three-dimensional representation of the attaching device of the invention.

DETAILED DESCRIPTION OF PREFERRED EMBODIMENTS

The accompanying drawing FIGURE shows a preferred embodiment of a fastening device according to the invention. The nut 1 has a through-bore 11 in its base body 10 in the embodiment shown here, which through-bore 11 has an internal thread by means of which the fastening device can be rotated, for example, on a bolt or a screw in order, for example, to join two components together. In the case of a cap nut 1, the bore 11 is accordingly a blind bore.

The nut 1 rotates inside a sleeve-like support unit 2 such that the support unit 2 substantially does not rotate therewith.

The base body 10 of the nut 1, which is shaped externally like a prism and internally like a circular cylinder, comprises at an end region 12 a shoulder 13 which protrudes outwardly, that is, from the bore 11. The function of the shoulder 13, among other things, is to provide the support unit 2 with a region that it can encompass so that a non-positive connection is established between the nut 1 and the support unit 2. A delimiting lip 14 is further provided on the shoulder 13, which delimiting lip defines a supporting surface 15 which serves as a lateral stop. The shoulder 13 and the lip 14 in this case are constructed to be rotationally symmetrical and to extend completely around the external surface of the base body 10. In an alternative embodiment, the shoulder 13 and the lip 14 are only made of segmentally constructed units.

In this embodiment, a first spring 31 of a spring unit 3 is located on the supporting surface 15. The outside diameter of the first spring 31 is substantially equal to the inside diameter of the lip 14. As a result of this feature, the first spring 31 is prevented from moving in the radial direction and it therefore also cannot slip in front of the through-bore 11 of the nut 1.

In this embodiment, the support unit 2 is constructed of a substantially circular bottom portion 20 which is adjoined by a circumferential side portion 21. In the bottom portion 20 there is an aperture 22, the diameter of which is substantially equal to that of the through-bore 11 of the nut 1 in this embodiment. In an alternative embodiment, the diameter of the aperture 22 in the bottom portion 20 is larger than the diameter of the through-bore 11 of the nut 1. The side portion 21 comprises a beveled region 23 that narrows toward the side located opposite from the bottom portion 20 and engages behind the shoulder 13 of the nut 1. In other words, the support unit 2 encompasses the end region 12 of the nut 1 and the shoulder 13 located here.

The support unit 2 and the nut 1 are constructed such that a hollow space 4 is located between them, in which the spring element 3 is disposed. The spring element 3 generates a spring force in the direction of the longitudinal axis of the nut 1, that is, in the direction in which the nut 1 is screwed onto a bolt (not shown in the FIGURE). The fastening device of the invention is supported by the bottom portion 20 against a component, for which purpose an external region 24 is constructed appropriately. For example, the external region may be adapted to exhibit anti-slip properties.

The second spring 32 of the spring element 3, which in this case is a two-part component, has an outside diameter that is substantially equal to the inside diameter of the side portion 21 of the support unit 2, so that the second spring 32 is also delimited in the radial direction. The spring element 3 likewise comprises an opening 30, with the bore 11 of the nut 1, the opening 30 of the spring element 3, and the aperture 22 of the support unit 2 substantially having the same inside radius in this embodiment and, moreover, all being disposed substantially one behind the other so as to be aligned with each other. In a further embodiment (not shown here), provision is made for a misaligned arrangement of the bores.

In an alternative embodiment (not shown here), there is a cover located between the shoulder 13 and the beveled region 23, which cover substantially prevents, for example, the entry of contaminants in the region between the shoulder 13 and the support unit 2 when the nut 1 is in a tightened state. In one embodiment, an annular washer is provided which is disposed around the nut 1 and between the shoulder 13 and the support unit 2, and which, in a further embodiment, is pressed against the beveled region 23 by an additional spring element.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A fastening device comprising:
at least one nut,
at least one support unit,
a first spring, and
a second spring,
wherein
the first spring and the second spring exert a force between the nut and the support unit substantially in a direction of a longitudinal axis of the at least one nut,
the at least one nut includes a base body with an aperture,
the base body on an end region has a shoulder protruding outwardly from the aperture,
the shoulder includes a lip, and the shoulder and the lip form a supporting surface,
the first spring has an outside diameter that is at least substantially equal to an inside diameter of the lip of the shoulder of the at least one nut, and the first spring is located on the supporting surface,
the second spring has an outside diameter that is at least substantially equal to an inside diameter of a side portion of the at least one support unit, and
the second spring is located in a space between the at least one support unit and the at least one nut.

2. A fastening device as defined in claim 1, wherein the support unit is provided with at least one external region which is constructed such that it substantially exhibits anti-slip properties.

* * * * *